United States Patent [19]

Frykholm

[11] 4,089,553
[45] May 16, 1978

[54] DEVICE FOR HANDLING POLE VAULT CROSSBARS

[76] Inventor: Paul R. Frykholm, 640 E. Lincoln, Libertyville, Ill. 60048

[21] Appl. No.: 789,350

[22] Filed: Apr. 21, 1977

[51] Int. Cl.² .............................................. B25J 1/00
[52] U.S. Cl. .................................... 294/19 R; 272/100
[58] Field of Search ................ 294/1 R, 5.5, 19 R, 294/20, 21, 22, 23, 104; 272/100-103

[56] References Cited

U.S. PATENT DOCUMENTS

| 674,627 | 5/1901 | Dinges | 294/19 R |
|---|---|---|---|
| 1,024,968 | 4/1912 | Beglinger | 294/19 R |
| 1,213,278 | 1/1917 | Seashore | 294/19 R |
| 3,129,970 | 4/1964 | St. John | 294/20 |
| 3,257,140 | 6/1966 | Lane | 294/20 |

FOREIGN PATENT DOCUMENTS 922,573   4/1963   United Kingdom .................. 294/20

*Primary Examiner*—Johnny D. Cherry
*Attorney, Agent, or Firm*—Hill, Gross, Simpson, Van Santen, Steadman, Chiara & Simpson

[57] ABSTRACT

A device for handling pole vault crossbars comrises a crosshead to be manipulated by a handle and having an upwardly opening channel groove in which a crossbar is adapted to be cradled and lifted into position at a desired elevation on pole vault standards. A finger mounted on the crosshead is biased into clamping retaining engagement with the cradled crossbar and is retractable from the crossbar by means of a retractor member such as a pull cord. By moving and holding the finger in retracted position to open the channel cradle for receiving a crossbar, the crossbar can be scopped up in the channel cradle from a ground lying position to which the crossbar may have dropped when dislodged from the pole vault standards. Then by releasing the finger to clamp and retain the crossbar, the crossbar can be easily manipulated to return it to the desired elevation on the standards.

10 Claims, 4 Drawing Figures

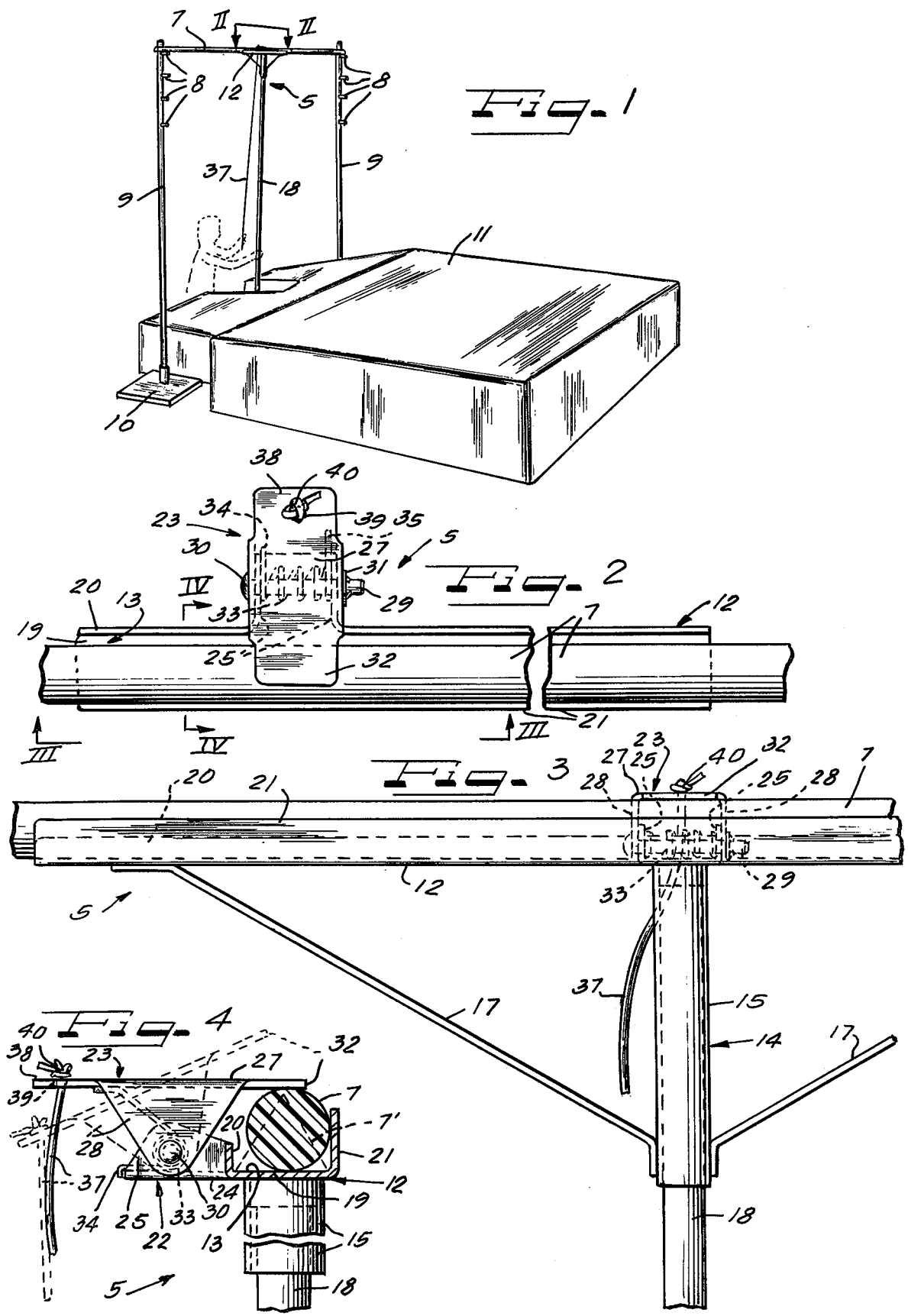

DEVICE FOR HANDLING POLE VAULT CROSSBARS

This invention relates to a new and improved device for handling pole vault crossbars.

Pole vaulting is a standard track and field event at all levels of accomplishment from junior high school through Olympic competition and professional competition. Performance requires that the pole vaulter clear a crossbar placed on and between standards at a suitable height. Generally crossbars for this event may be about 16 ft. long and weigh about 8 to 12 ounces. Even though the crossbars are relatively light in weight, their length makes it difficult to handle them for initial placement and for replacement to the 8 to 18 ft. elevation from the ground at which the crossbars must be placed, depending upon the skill of the pole vaulters in any given event. Devices heretofore available for this purpose have generally required extremely careful balancing of the crossbar while manipulating it into position, often requiring two persons to accomplish the crossbar placement and sometimes even necessitating snorkel type hydraulic apparatus to maneuver a crossbar handler for the purpose.

I have been apprised of the following U.S. patents intended for handling fluorescent lamp tubes:

| | | |
|---|---|---|
| 3,257,140 | June 21, 1966 | S.B. Lane |
| 2,427,842 | September 23, 1947 | J.D. Diver |
| 2,589,642 | March 18, 1952 | L. Stueland |
| 2,504,152 | April 18, 1950 | R.T. Riker et al |
| 3,129,970 | April 21, 1964 | G.A. St. John |

However, all of the above noted patents are concerned with clamping jaws for engaging the tubular lamps. Not only are the clamping jaws of generally rather complex construction, but they are unsuited for efficiently handling a pole vaulting crossbar. The pole vault standards are provided with crossbar supporting pins extending away from the direction from which the bar is approached by a pole vaulter so that if the vaulter merely touches the bar it will drop from the pins. By the same token, placing the crossbars on the pins is a very delicate maneuver. Not only must the crossbar be very easily released from the handling device, but it must also not be jostled in any way lest it be dislodged from the pins. The devices represented by the foregoing patents are not suited for the purpose of placing pole vault crossbars and it is probably for that reason none of them, to the best of my knowledge and belief, have ever been adapted for any purpose other than handling fluorescent light tubes.

It is an important object of the present invention to provide a new and improved device for conveniently and efficiently handling and placing pole vault crossbars.

Another object of the invention is to provide a new and improved device for handling and placing pole vault crossbars and which device is simple and rugged in construction, and is especially well suited for holding the crossbar firmly while being handled and maneuvered into position, and which can be easily and simply and effectively released from the crossbar without dislodging the crossbar from the supporting pins on the pole vault standards.

According to features of the invention there is provided a new and improved device adapted for handling and manipulating a pole vault crossbar into position on supporting pins at a selected elevation on spaced upright pole vault standards, and comprising a head having a generally horizontal elongate cradling trough having rear and front sides and adapted to receive a crossbar cradled therein, said trough being defined by a base portion, upstanding rear flange means and unobstructed upstanding scooping and crossbar retaining front flange means; elongate handle means connected to said head and extending downwardly generally normal to said trough for manipulating the device, and with the forward perimeter area of the handle means near a plane along and projected down from said front flange; a supporting structure on said head extending rearwardly relative to said rear flange means of the trough, an elongate clamping member, means spaced from said rear flange means and mounting the clamping member movably on said supporting structure, said clamping member having a substantially straight clamping finger portion extending from said mounting means above said rear flange means into overlying clamping relation to the trough, means acting between said supporting structure and said clamping member for normally biasing said clamping member toward said trough to urge said clamping finger portion down into clamping retaining engagement relation with respect to a crossbar in the trough with sufficient clamping force to permit the crossbar to be handled by manipulation of the device from a generally ground level position into supported position on pins at a selected elevation on the standards, clamp retracting means connected to said clamping member and adapted for moving the clamping member in opposition to said biasing means to retract the clamping finger portion from said clamping relation as an initial maneuver to clear the trough for receiving the crossbar therein as by scooping the crossbar into the trough from a generally ground level surface by means of said front flange means, said clamp retracting means being releasable to release the clamping member for biased clamping retaining engagement of said clamping finger portion with the crossbar received in said trough, and said clamp retracting means being operable after the crossbar has been raised up to and placed on the selected supporting pins on the standards to retract said clamping member against the force of said biasing means and thereby release and clear said clamping finger portion from its biased clamping retaining engagement with the crossbar and into substantial clearance relation to said front flange means whereby to permit free removal of the device from the crossbar to leave the crossbar in position on the selected supporting pins on the standards, the device being adapted when not in use to be laid upon a floor or like surface with said front flange means and said handle means supporting the device substantially flat face down on such surface with said supporting structure and said clamping member then extending upwardly away from said structure.

According to additional features of the invention there is provided a device adapted for handling and manipulating a pole vault crossbar into position on supporting pins at a selected elevation on spaced upright pole vault standards, and comprising a horizontally elongate head formed as a one-piece structure and having a base, upstanding rear reinforcing flange means and unobstructed upstanding scooping and crossbar retaining front flange means, the base portion and said rear and front flange means substantially defining an upwardly opening crossbar cradling trough; elongate handle means connected to and projecting downwardly from substantially the longitudinal center of said base portion and with the forward perimeter area of the handle means near a plane along and projected down from said front flange, supporting structure extending rearwardly from the central part of said base portion, an elongate clamping member having a forwardly extending clamping finger and a rearwardly extending manipulating portion, depending rocker means intermediately on said clamping member between said clamping finger and said rearwardly extending portion, upwardly projecting means on said supporting structure spaced rearwardly relative to said rear flange means; means pivotally connecting said rocker means and said upwardly extending means whereby said finger portion is adapted to extend above said rear flange means into overlying relation to said base portion for clamping engagement with a crossbar received in said trough, and said rearwardly extending clamping member portion projecting rearwardly relative to said supporting structure; biasing spring means operating between said clamping member and said supporting structure and normally biasing said clamping member to urge said clamping finger downwardly into clamping retaining engagement with a crossbar in the trough with sufficient clamping force to permit the crossbar to be handled by manipulation of the device from a generally ground level position into supporting position on pins at a selected elevation on the standards, clamp retracting means connected to said rearwardly extending portion of the clamping member and adapted for rocking the clamping member in opposition to said biasing spring means to retract the clamping finger from said clamping relation as an initial maneuver to clear the trough for receiving the crossbar therein as by scooping the crossbar into the trough from a generally ground level surface by means of said front scooping flange means, said clamp retracting means being releasable to release the clamping member for biasing by said spring means to urge said clamping member finger into engagement with the crossbar received in said trough, and said clamp retracting means being operable after the crossbar has been raised up to and placed on the selected supporting pins on the standard to pull down on said rearwardly extending portion of the clamping member and rock the clamping member against the force of said biasing spring means and thereby release and clear said clamping finger from its biased clamping retaining engagement with the crossbar and into substantial clearance relation relative to said front flange means whereby to permit free removal of the device from the crossbar to leave the crossbar in position on the selected supporting pins on the standards, the device being adapted when not in use to be laid upon a floor or like surface with said front flange means and said handle means supporting the device substantially flat face down on such surface with said supporting structure and said clamping member then extending upwardly away from said surface.

Other objects, features and advantages of the invention will be readily apparent from the following description of a representative embodiment thereof, taken in conjunction with the accompanying drawings although variations and modifications may be effected without departing from the spirit and scope of the novel concepts embodied in the disclosure and in which:

FIG. 1 is a perspective view showing a pole vault apparatus demonstrating placement of a crossbar in position on the pole vault standards by means of a device according to the present invention and according to the present method.

FIG. 2 is a fragmental top plan view taken substantially along the line II—II of FIG. 1.

FIG. 3 is a fragmentary plan view of the device taken substantially in the plane of line III—III of FIG. 2; and FIG. 4 is a fragmental vertical sectional detail view taken substantially along the line IV—IV of FIG. 2.

A device 5 embodying features of the invention is adapted for handling and manipulating a pole vault crossbar 7 into position on supporting pins 8 (FIG. 1) at a selected elevation on spaced upright pole vault standards 9. Such standards as is common practice may be of the portable variety supported in upright position on respective weighted bases 10. A cushion 11 or other fall breaking means may be provided at the general ground level in association with the standards 9.

In a preferred construction, the device 5 comprises a head 12 which is desirably of substantial length and has a generally horizontal (considered in the in-use orientation) elongate cradling trough 13 adapted to receive the crossbar 7 cradled therein. Although the crossbar 7 as shown is of generally cylindrical form (FIG. 4), it may be of the generally triangular form as shown at 7' in FIG. 4. For manipulating the same, the head 12 has handle means 14 connected thereto and extending generally normal to the trough 13. In a desirable form, the handle means comprise a tubular socket 15 fixed centrally to the head 12 under the trough 13 and stabilized by diagonal braces 17 fixed to the socket and to the opposite end portions of the head. A manipulating handle pole 18 is suitably secured in the socket 15. The pole 18 may be of whatever length desired, and in any event long enough to manipulate the head 12 and the crossbar 7 carried therein to the highest pins 8 on the standards 9.

In a preferred construction, the trough 13 is defined by a base portion 19 of the head 12, an upstanding flange 20 along the back edge of the base portion 19, and an upstanding unobstructed scooping and crossbar retaining flange 21 along the front edge of the base portion 19. The width of the base portion 19 and the space between the flanges 20 and 21 is ample to receive the crossbar 7 freely in the trough 13. Desirably, the front flange 21 is of a width, that is vertical dimension, greater than the radius of the crossbar 7 so as to facilitate scooping the crossbar from a generally ground level position into the trough by manipulation of the head 12 by means of the handle 14. As will be observed, particularly in FIG. 4, the elongate handle means socket 15 extends downwardly generally normal to the trough provided by the head 7, and with the forward perimeter area of the handle means socket 15 near a plane along and projected down from the front flange 21.

Means are provided for selectively retaining the crossbar 7 in the trough 13. For this purpose, supporting structure 22 is provided on the head 12 at one longitudinal side of the trough 13, in this instance at the back side of the trough and at the longitudinal center of the head 12 and on which is carried a clamping member 23. Where the trough head 12 is formed up from suitable gauge sheet metal such as aluminum, the supporting structure 22 comprises an integral lateral extension from the head body base portion 19 providing, in effect, a relatively narrow laterally projecting platform 24 along each side of which is formed up a reinforcing and clamping member mounting ear flange 25 which is not only integral with the platform 24, but also integrally joined to the rear flange 20 of the head structure. Thereby, the supporting structure 22 forms a strong, rigid, thoroughly reinforced part of the head. Although the supporting structure 22 has been shown and described as formed integrally in one piece with the head 12, the supporting structure may, if preferred, be constructed as a separate element suitably secured to the head 12.

In a simple and efficient construction, the clamping member 23 comprises an elongate body 27 formed up from suitable sheet metal and having a pair of spaced parallel depending coextensive reinforcing and rocket flange ears or arms 28, one of each of which is formed integrally and bent down along each side of the clamping member body 27. The space between the rocker arms 28 is complementary to the space between the outer surfaces of the upstanding supporting ears 25 so that the arms 28 can be mounted in straddling, relatively slidably movable rocking relation to the ears 25. Means for mounting the clamping member movably on the supporting structure 22 comprise a headed pivot pin 29 extending through suitable aligned bearing apertures in the ears 25 and the arms 28 and retained against displacement at one end by means of an integral head 30 on the pin and at its opposite end by means of a retainer 31 which may be in the form of a self-gripping press nut, or the like. As thus mounted, a forwardly projecting integral clamping portion 32 of the clamping member body portion 27, desirably in the form of a substantially straight finger of substantial width is adapted to extend above the rear flange 20 and to overlie the trough 13 in clamping relation.

Means are provided for normally biasing the clamping member 23 toward the trough 13 to urge the clamping portion finger 32 down into clamping retaining engagement relation with respect to the crossbar 7 in the trough 13 with sufficient clamping force to permit the crossbar to be handled by manipulation of the device 5 from a generally ground level position into supported position on the pins 8 at a selected elevation on the standards 9. In an efficient structure for this purpose, a coiled torsion spring 33 is mounted about the pin 29 between the ears 25 and has one leg 34 thrusting against the platform 24 and a second leg 35 thrusting in biasing relation against the underside of the rear portion of the clamping member body 27, thereby normally biasing the clamping member 23 to rock toward the trough 13.

Clamp retracting means are connected to the clamping member 23 and adapted for moving the clamping member in opposition to the biasing spring means 33 to retract the clamping portion finger 32 from its clamping relation as an initial maneuver to clear the trough 13 for receiving the crossbar 7 therein as by scooping the crossbar into the trough 13 from a generally ground level surface. For this purpose a pull member 37 conveniently in the form of a manually engageable chain or cord 37 is attached to a rearwardly extending trip portion 38 of the clamping member body 27. Conveniently the pull member 37, in the form of a cord, extends through a suitable aperture 39 in the trip portion 38 and has a retaining knot 40 overlying the trip portion. Through this arrangement, pulling down on the pull cord 37 causes the clamping member 23 to rock into retracted, trough clearing relation as shown in dash outline in FIG. 4. After the crossbar 7 has been received in the trough 13, the pull member 37 is released and thereby releases the clamping member 23 for biased clamping retaining engagement with the crossbar. After the crossbar 7 has been raised up to and placed on the selected supporting pins 8 on the standards 9, substantially as shown in FIG. 1, the clamp retracting pull member 37 is operable to retract the clamping member 23 against the force of the biasing spring 33 and thereby release and clear the clamping portion 32 from its biased clamping retaining engagement with the crossbar 7 and into substantial clearance relation to the front flange 21 whereby to permit free removal of the device 5 from the crossbar to leave the crossbar in position on the selected supporting pins on the standards. Such maneuver is facilitated by the fact that the clamping member 23 is at the rear of the head 12 so that in the most convenient manner of maneuvering the device 5 with the crossbar 7 carried thereby into position relative to the pins 8 on the standards 9 and wherein the front of the head 12 faces in the same direction that the pins 8 project, and the rear of the head 12 faces in the opposite direction, when the crossbar has been placed on the pins and the clamping device 23 retracted, the upstanding front cradling flange tends to hold the crossbar on the pins 8, and any contact between the flange 21 and the crossbar as the device is withdrawn from the pin mounted crossbar only tends to improve the mounted relation of the crossbar by if anything thrusting it toward the standards 9. Because the crossbar 7 is quite light in weight and is very easily displaced from the supporting pins 8, the described propensity of the head 12 to improve rather than upset the mounted relation of the crossbar on the pins during release of the crossbar from the head 12 and withdrawal of the device 5 substantially contributes to rapid, efficient and assured mounting of the crossbar by means of the device 5.

In a typical construction, the head 12 may be about 2 feet long, the trough 13 may be about 1¼ inches wide and the upstanding front cradling flange 21 may be about ¾ of an inch high. The clamping member 23 may be about 3⅝ inches in overall lever length overlying the supporting structure platform 24 at a height of about 1¼ inches and with the center of the pivot 29 about 1½ inches from the longitudinal center of the trough 13. The pole socket 15 may be about 6 inches long, and the pole 18 may be as long as necessary and provided with a slightly tapered upper end so that it can be frictionally jammed into the socket 15 from the bottom and separated from the socket when desired, as for packing the device for storage or travelling purposes.

Advantageously the device 5 is adapted when not in use to be laid upon a floor or like surface with the front flange 21 and the handle means part 15 supporting the device substantially flat face down on such surface with the supporting structure 22 and the clamping member 23 then extending upwardly away from the supporting surface.

It will be understood that variations and modifications may be effected without departing from the spirit and scope of the novel concepts of this invention.

I claim as my invention:

1. A device adapted for handling and manipulating a pole vault crossbar into position on supporting pins at a selected elevation on spaced upright pole vault standards, and comprising:

a head having a generally horizontal elongate cradling trough having rear and front sides and adapted to receive a crossbar cradled therein;

said trough being defined by a base portion, upstanding rear flange means and unobstructed upstanding scooping and crossbar retaining front flange means;

elongate handle means connected to said head and extending downwardly generally normal to said trough for manipulating the device, and with the forward perimeter area of the handle means near a plane along and projected down from said front flange;

a supporting structure on said head extending rearwardly relative to said rear flange means of the trough;

an elongate clamping member;

means spaced from said rear flange means and mounting the clamping member movably on said supporting structure;

said clamping member having a substantially straight clamping finger portion extending from said mounting means above said rear flange means into overlying clamping relation to the trough;

means acting between said supporting structure and said clamping member for normally biasing said clamping member toward said trough to urge said clamping finger portion down into clamping retaining engagement relation with respect to a crossbar in the trough with sufficient clamping force to permit the crossbar to be handled by manipulation of the device from a generally ground level position into supported position on pins at a selected elevation on the standards;

clamp retracting means connected to said clamping member and adapted for moving the clamping member in opposition to said biasing means to retract the clamping finger portion from said clamping relation as an initial maneuver to clear the trough for receiving the crossbar therein as by scooping the crossbar into the trough from a generally ground level surface by means of said front flange means;

said clamp retracting means being releasable to release the clamping member for biased clamping retaining engagement of said clamping finger portion with the crossbar received in said trough; and said clamp retracting means being operable after the crossbar has been raised up to and placed on the selected supporting pins on the standards to retract said clamping member against the force of said biasing means and thereby release and clear said clamping finger portion from its biased clamping retaining engagement with the crossbar and into substantial clearance relation to said front flange means whereby to permit free removal of the device from the crossbar to leave the crossbar in position on the selected supporting pins on the standards;

the device being adapted when not in use to be laid upon a floor or like surface with said front flange means and said handle means supporting the device substantially flat face down on such surface with said supporting structure and said clamping member then extending upwardly away from said surface.

2. A device according to claim 1, wherein said supporting structure comprises a platform extending from said rear side, said platform having upstanding reinforcing and clamping member supporting ears, said means mounting the clamping member on the supporting structure comprising pivot means pivotally connecting the clamping member to said ears.

3. A device according to claim 2, wherein said clamping member comprises a lever body having reinforcing and mounting arms extending downwardly and engaged by said pivot means.

4. A device according to claim 1, wherein said clamping member comprises a lever intermediately pivotally mounted on said supporting structure by said mounting means, said clamping finger portion comprising a foward extension of the lever, and a rearward extension of the lever having said clamp retracting means connected thereto.

5. A device according to claim 4, wherein said clamp retracting means comprise a pull member attached to said rearward extension of the clamping member lever.

6. A device according to claim 1, wherein said clamping member comprises an intermediately pivoted lever, and said biasing means comprise a biasing spring normally pivotally urging biasing the clamping member lever finger portion toward said trough.

7. A device according to claim 1, wherein said head comprises a substantially rigid channel-shaped structure having said base portion and said trough-defining flanges in reinforcing relation along longitudinal edges of said base portion, said supporting structure comprising a platform extending rearwardly integrally in one piece from said base portion, and said mounting means being located on the upper side of said platform for pivotally connecting said clamping member to the platform.

8. A device adapted for handling and manipulating a pole vault crossbar into position on supporting pins at a selected elevation on spaced upright pole vault standards, and comprising:

a horizontally elongate head formed as a one-piece structure and having a base, upstanding rear reinforcing flange means and unobstructed upstanding scooping and crossbar retaining front flange means, the base portion and said rear and front flange means substantially defining an upwardly opening crossbar cradling trough;

elongate handle means connected to and projecting downwardly from substantially the longitudinal center of said base portion and with the forward perimeter area of the handle means near a plane along and projected down from said front flange;

supporting structure extending rearwardly from the central part of said base portion;

an elongate clamping member having a forwardly extending clamping finger and a rearwardly extending manipulating portion;

depending rocker means intermediately on said clamping member between said clamping finger and said rearwardly extending portion;

upwardly projecting means on said supporting structure spaced rearwardly relative to said rear flange means;

means pivotally connecting said rocker means and said upwardly extending means whereby said finger portion is adapted to extend above said rear flange means into overlying relation to said base portion for clamping engagement with a crossbar received in said trough, and said rearwardly extending clamping member portion projecting rearwardly relative to said supporting structure;

biasing spring means operating between said clamping member and said supporting structure and normally biasing said clamping member to urge said clamping finger downwardly into clamping retaining engagement with a crossbar in the trough with sufficient clamping force to permit the crossbar to be handled by manipulation of the device from a generally ground level position into supported on pins at a selected elevation on the standards;

clamp retracting means connected to said rearwardly extending portion of the clamping member and adapted for rocking the clamping member in opposition to said biasing spring means to retract the clamping finger from said clamping relation as an initial maneuver to clear the trough for receiving the crossbar therein as by scooping the crossbar into the trough from a generally ground level surface by means of said front scooping flange means;

said clamp retracting means being releasable to release the clamping member for biasing by said spring means to urge said clamping member finger into engagement with the crossbar received in said trough;

and said clamp retracting means being operable after the crossbar has been raised up to and placed on the selected supporting pins on the standard to pull down on said rearwardly extending portion of the clamping member and rock the clamping member against the force of said biasing spring means and thereby release and clear said clamping finger from its biased clamping retaining engagement with the crossbar and into substantial clearance relation relative to said front flange means whereby to permit free removal of the device from the crossbar to leave the crossbar in position on the selected supporting pins on the standards;

the device being adapted when not in use to be laid upon a floor or like surface with said front flange means and said handle means supporting the device substantially flat face down on such surface with said supporting structure and said clamping member then extending upwardly away from said surface.

9. A device according to claim 8, wherein said supporting structure comprises an integral rearward extension from said base portion, and said upstanding means comprise spaced upstanding flanges on the rearward extension integral with said upstanding rear flange means, and affording substantial rigidity for said supporting structure.

10. A device according to claim 8, wherein said handle means comprise a downwardly extending tubular socket of substantial length fixedly attached to said base portion and receptive of a manipulating pole, and diagonal braces fixedly attached to a lower portion of said tubular socket and extending therefrom into engagement with and fixedly attached to respective opposite end areas of said base portion.

* * * * *